United States Patent
Gilbert et al.

(10) Patent No.: US 6,459,514 B2
(45) Date of Patent: *Oct. 1, 2002

(54) MULTILAYER POLYMER FILM WITH ADDITIONAL COATINGS OR LAYERS

(75) Inventors: Laurence R. Gilbert; James M. Jonza; Andrew J. Ouderkirk; Carl A. Stover; Michael F. Weber; William W. Merrill, all of St. Paul, MN (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/419,946

(22) Filed: Oct. 18, 1999

Related U.S. Application Data

(62) Division of application No. 08/910,660, filed on Aug. 13, 1997, now Pat. No. 6,368,699, which is a continuation of application No. 08/494,416, filed on Jun. 26, 1995, now abandoned.

(51) Int. Cl.[7] .................. B32B 27/08; G02B 5/08; G02B 5/28; G02B 5/30; G02B 5/32

(52) U.S. Cl. .................. 359/15; 428/212; 428/343; 428/480; 359/1; 359/13; 359/487; 359/488; 359/493; 359/494; 359/500

(58) Field of Search .................. 428/212, 480, 428/343; 359/493, 494, 500, 1, 2, 15, 13, 487, 488

(56) References Cited

U.S. PATENT DOCUMENTS

| | | | |
|---|---|---|---|
| 3,124,639 A | 3/1964 | Kahn | .................. 88/65 |
| 3,531,313 A | 9/1970 | Dates | .................. 117/33.3 |
| 3,565,985 A | 2/1971 | Schrenk et al. | .................. 264/171 |

(List continued on next page.)

FOREIGN PATENT DOCUMENTS

| | | | |
|---|---|---|---|
| AU | 9518663 | 8/1995 | |
| CA | 724101 | 12/1965 | |
| CA | 1327286 | 3/1994 | .................. 88/113.18 |

(List continued on next page.)

OTHER PUBLICATIONS

Alfrey, Jr. et al., "Physical Optics of Iridescent Multilayered Plastic Films", *Polymer Engineering and Science*, , vol. 9, No. 6, p. 400–404 (Nov. 1969).

Hodgkinson, I. et al., "Effective Principal Refractive Indices and Column Angles for Periodic Stacks of Thin Birefringent Films", *J. Opt. Soc. Am. A*, vol. 10, No. 9, p. 2065–71 (1993).

Im, J. et al., "Coextruded Microlayer Film and Sheet", *Journal of Plastic Film and Sheeting*, vol. 4, p. 104–15 (Apr., 1988).

Radford et al., "Reflectivity of Iridescent Coextruded Multilayered Plastic Films", *Polymer Engineering and Science*, vol. 13, No. 3, (May 1973); Dow Chemical Co., American Chemical Society Symposium on "Coextruded Plastic Films, Fibers, Composites", Apr. 9–14, 1972.

(List continued on next page.)

*Primary Examiner*—Vivian Chen
(74) *Attorney, Agent, or Firm*—Stephen W. Buckingham; Carolyn V. Peters

(57) ABSTRACT

A multilayer optical film comprising: (a) an optical stack comprising alternating layers of at least a first polymer and a second polymer; and (b) a holographic image.

8 Claims, 10 Drawing Sheets

U.S. PATENT DOCUMENTS

| | | | |
|---|---|---|---|
| 3,610,729 A | 10/1971 | Rogers | 350/157 |
| 3,647,612 A | 3/1972 | Schrenk et al. | 161/165 |
| 3,711,176 A | 1/1973 | Alfrey, Jr. et al. | 350/1 |
| 3,759,647 A | 9/1973 | Schrenk et al. | 425/131 |
| 3,773,882 A | 11/1973 | Schrenk | 264/171 |
| 3,776,805 A | 12/1973 | Hansen | 161/2 |
| 3,801,429 A | 4/1974 | Schrenk et al. | 161/181 |
| 3,860,036 A | 1/1975 | Newman, Jr. | 138/45 |
| 4,094,947 A | 6/1978 | Alfrey, Jr. et al. | 264/171 |
| 4,249,011 A | 2/1981 | Wendling | 548/312 |
| 4,307,150 A | 12/1981 | Roche | 428/336 |
| 4,310,584 A | 1/1982 | Cooper et al. | 428/212 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,540,623 A | 9/1985 | Im et al. | 428/220 |
| 4,645,714 A | 2/1987 | Roche et al. | 428/458 |
| 4,666,263 A | 5/1987 | Petcavich | 350/640 |
| 4,713,143 A | 12/1987 | Eisfeller | 156/655 |
| 4,720,426 A | 1/1988 | Englert et al. | 428/344 |
| 4,856,857 A * | 8/1989 | Takeuchi et al. | 350/3.6 |
| 4,937,134 A | 6/1990 | Schrenk et al. | 428/213 |
| 4,973,132 A * | 11/1990 | McDonald et al. | 350/174 |
| 4,998,784 A * | 3/1991 | Freeman et al. | 350/3.7 |
| 5,089,318 A | 2/1992 | Shetty et al. | 428/212 |
| 5,094,788 A | 3/1992 | Shcrenk et al. | 264/171 |
| 5,094,793 A | 3/1992 | Schrenk et al. | 264/171 |
| 5,095,210 A | 3/1992 | Wheatley et al. | 250/339 |
| 5,103,337 A | 4/1992 | Schrenk et al. | 359/359 |
| 5,122,905 A | 6/1992 | Wheatley et al. | 359/586 |
| 5,122,906 A | 6/1992 | Wheatley | 359/586 |
| 5,126,880 A | 6/1992 | Wheatley et al. | 359/587 |
| 5,149,578 A | 9/1992 | Wheatley et al. | 428/213 |
| 5,188,760 A | 2/1993 | Hikmet et al. | 252/299.01 |
| 5,202,074 A | 4/1993 | Schrenk et al. | 264/241 |
| 5,211,878 A | 5/1993 | Reiffenrath et al. | 252/299.63 |
| 5,217,794 A | 6/1993 | Schrenk | 428/220 |
| 5,227,185 A | 7/1993 | Gobran | 428/426 |
| 5,233,465 A | 8/1993 | Wheatley et al. | 359/359 |
| 5,234,729 A | 8/1993 | Wheatley et al. | 428/30 |
| 5,235,443 A | 8/1993 | Barnik et al. | 359/37 |
| 5,251,064 A | 10/1993 | Tennant et al. | 359/361 |
| 5,262,894 A | 11/1993 | Wheatley et al. | 359/586 |
| 5,269,995 A | 12/1993 | Ramanathan et al. | 264/171 |
| 5,278,694 A | 1/1994 | Wheatley et al. | 359/359 |
| 5,294,657 A | 3/1994 | Melendy et al. | 524/270 |
| 5,300,764 A * | 4/1994 | Hoshino et al. | 235/487 |
| 5,307,205 A | 4/1994 | Ludwig, Jr. et al. | 359/453 |
| RE34,605 E | 5/1994 | Schrenk et al. | 359/359 |
| 5,310,857 A | 5/1994 | Jones et al. | 528/220 |
| 5,316,703 A | 5/1994 | Schrenk | 264/1.3 |
| 5,319,478 A | 6/1994 | Fijnfschilling et al. | 359/53 |
| 5,339,198 A | 8/1994 | Wheatly et al. | 359/359 |
| 5,341,230 A * | 8/1994 | Smith | 359/13 |
| 5,360,659 A | 11/1994 | Arends et al. | 428/216 |
| 5,361,172 A | 11/1994 | Schissel et al. | 359/883 |
| 5,389,324 A | 2/1995 | Lewis et al. | 264/171 |
| 5,424,119 A | 6/1995 | Phillips et al. | 428/328 |
| 5,448,404 A | 9/1995 | Schrenk et al. | 359/584 |
| 5,451,449 A | 9/1995 | Shetty et al. | 428/195 |
| 5,481,445 A | 1/1996 | Sitzema et al. | 362/308 |
| 5,486,935 A | 1/1996 | Kalmanash | 359/37 |
| 5,486,949 A | 1/1996 | Schrenk et al. | 359/498 |
| 5,540,978 A | 7/1996 | Schrenk | 428/212 |
| 5,552,927 A | 9/1996 | Wheatly et al. | 359/359 |
| 5,568,316 A | 10/1996 | Schrenk et al. | 359/584 |
| 5,605,761 A | 2/1997 | Burns et al. | 428/412 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,816,238 A | 10/1998 | Burns et al. | 126/569 |
| 5,825,542 A | 10/1998 | Cobb, Jr. et al. | 359/487 |
| 5,825,543 A | 10/1998 | Ouderkirk et al. | 359/494 |
| 5,828,488 A | 10/1998 | Ouderkirk et al. | 359/487 |
| 5,872,653 A | 2/1999 | Schrenk et al. | 359/498 |
| 5,882,774 A | 3/1999 | Jonza et al. | 428/212 |
| 6,024,455 A * | 2/2000 | O'Neill et al. | 359/530 |

FOREIGN PATENT DOCUMENTS

| | | | |
|---|---|---|---|
| DE | 0 723 878 B1 | 3/1999 | B42D/15/10 |
| EP | 062751 | 10/1982 | |
| EP | 0404463 | 12/1990 | |
| EP | 469732 | 7/1991 | |
| EP | 514223 | 5/1992 | |
| EP | 0488544 | 6/1992 | |
| EP | 0 488 544 A1 * | 6/1992 | |
| JP | 5-288910 | 11/1993 | |
| JP | 6-11607 | 1/1994 | |
| JP | HEI 10-24514 | 1/1998 | |
| WO | WO 91/09719 | 7/1991 | |
| WO | WO 94/10589 | 5/1994 | |
| WO | WO 94/26512 | 11/1994 | |
| WO | WO 95/27919 | 4/1995 | |
| WO | WO 95/17303 | 6/1995 | |
| WO | WO 95/17691 | 6/1995 | |
| WO | WO 95/17692 | 6/1995 | |
| WO | WO 95/17699 | 6/1995 | |
| WO | WO 96/19347 | 6/1996 | |
| WO | WO 97/01440 | 1/1997 | |
| WO | WO 97/01774 | 1/1997 | |
| WO | WO 97/32226 | 9/1997 | |

OTHER PUBLICATIONS

Schrenk, W. et al., "Coextruded Iridescent Film", TAPPI Paper Synthetics Conference, Atlanta, Georgia, p. 141–5 (Sep. 27–29, 1976).

Schrenk et al., "Coextruded Multilayer Polymer Films and Sheet", Chapt. 15, *Polymer Blends*, vol. 2, 129, Academic Press, Inc. (1978).

Schrenk et al., "Interfacial Flow Instability in Multilayer Coextrusion", *Polymer Engineering and Science*, vol. 18 (8), p. 620–3 (Jun. 1978).

Schrenk, W. et al., "Coextruded Elastomeric Optical Interference Film", SPE Annual Technical Conference, Atlanta, GA p. 1703–7 (1988).

Schrenk, W. et al., "Coextruded Infrared Reflecting Films", 7th Annual Meeting Polymer Processing Society, Hamilton, Ontario, Canada, p. 222–3 (Apr. 1991).

Schrenk, W., "New Developments in Coextrusion", International Conference on Advances In Polymer Processing, New Orleans, Louisiana, (Apr., 1991).

Meitaku, "LCD Technology–Liquid Crystal Panel TFT Backlight", Article No. 2, p 6–9 (undated).

Schrenk et al., Nanolayer polymeric optical films, Tappi Journal, pp. 169–174, Jun., 1992.

* cited by examiner

MULTILAYER POLYMER FILM WITH ADDITIONAL COATINGS OR LAYERS

RELATED APPLICATION

This is a division of U.S. patent application Ser. No. 08/910,660, filed Aug. 13, 1997, U.S. Pat. No. 6,368,699, which is a continuation of U.S. patent application Ser. No. 08/494,416 filed Jun. 26, 1995, abandoned.

BACKGROUND OF THE INVENTION

Multilayer optical stacks are well-known for providing a wide variety of optical properties. Such multilayer stacks may act as reflective polarizers or mirrors, reflecting light of all polarizations. They may also function as wavelength selective reflectors such as "cold mirrors" that reflect visible light but transmit infrared or "hot mirrors" that transmit visible and reflect infrared. Examples of a wide variety of multilayer stacks that may be constructed are included in U.S. patent application Ser. No. 08/402,041 filed Mar. 10, 1995, U.S. Pat. No. 5,882,774.

A problem with multilayer stacks as known in the art is that the stacks themselves may not have all of the physical, chemical, or optical properties desired. Some way of otherwise supplying these desirable properties would therefore be useful.

SUMMARY OF THE INVENTION

According to one embodiment of the invention a multilayer film has adhered to one or both of its major surfaces at least one additional layer selected for mechanical, chemical, or optical properties that differ from the properties of the materials of the layers of the optical stack.

According to another embodiment of the invention a multilayer film has adhered to one or both of its surfaces an additional layer that will protect the multilayer optical stack.

DETAILED DESCRIPTION

Multilayer Optical Film

The advantages, characteristics and manufacturing of multilayer optical films are most completely described in the above-mentioned copending and commonly-assigned U.S. patent application Ser. No. 08/402,041, filed Mar. 10, 1995, titled OPTICAL FILM, U.S. Pat. No. 5,882,774, which is incorporated herein by reference. The multilayer optical film is useful, for example, as highly efficient mirrors and/or polarizers. A relatively brief description of the properties and characteristics of the multilayer optical film is presented below followed by a description of illustrative embodiments of backlight systems using the multilayer optical film according to the present invention.

Multilayer optical films as used in conjunction with the present invention exhibit relatively low absorption of incident light, as well as high reflectivity for off-axis as well as normal light rays. These properties generally hold whether the films are used for pure reflection or reflective polarization of light. The unique properties and advantages of the multilayer optical film provides an opportunity to design highly-efficient backlight systems which exhibit low absorption losses when compared to known backlight systems.

Figure 1A:
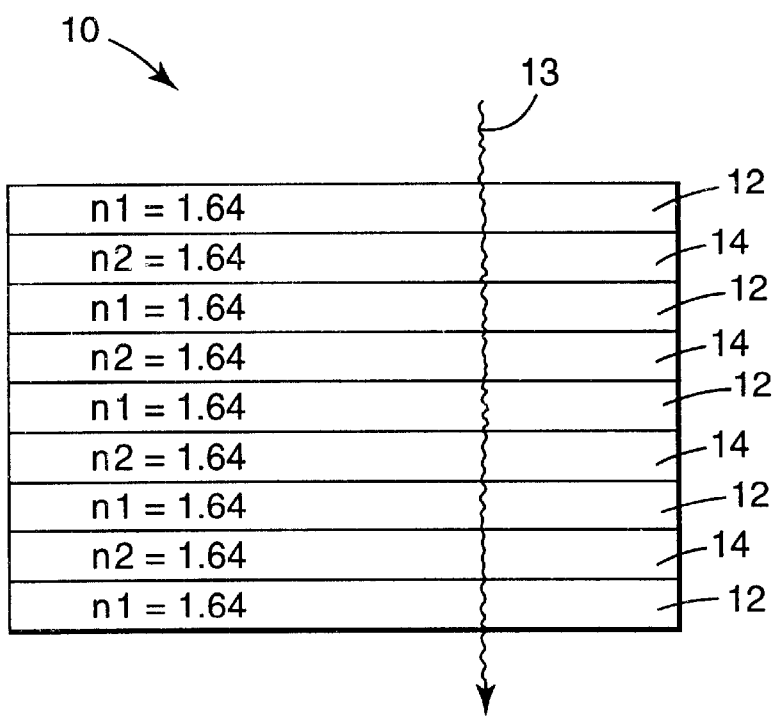
FIGS. 1A, 1B, and 2 show the preferred multilayer optical film.
Figure 1B:
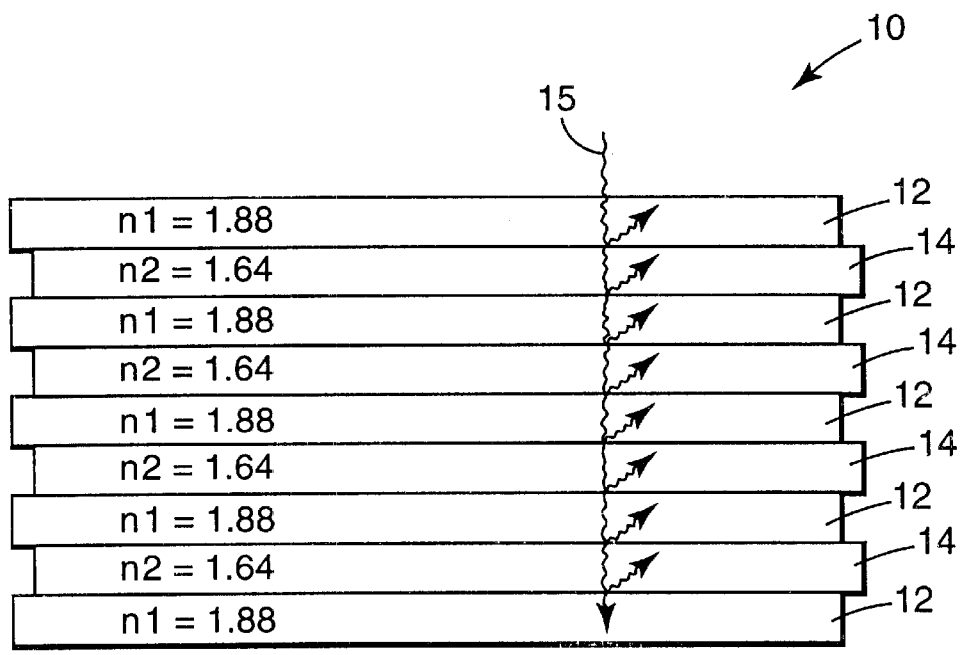

An exemplary multilayer optical film of the present invention as illustrated in FIGS. 1A and 1B includes a multilayer stack 10 having alternating layers of at least two materials 12 and 14. At least one of the materials has the property of stress induced birefringence, such that the index of refraction (n) of the material is affected by the stretching process. FIG. 1A shows an exemplary multilayer stack before the stretching process in which both materials have the same index of refraction. Light ray 13 experiences relatively little change in index of refraction and passes through the stack. In FIG. 1B, the same stack has been stretched, thus increasing the index of refraction of material 12. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors.

Multilayer optical films constructed according to the present invention exhibit a Brewster angle (the angle at which reflectance goes to zero for light incident at any of the layer interfaces) which is very large or is nonexistent for the polymer layer interfaces. In contrast, known multilayer polymer films exhibit relatively small Brewster angles at layer interfaces, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Figure 2:
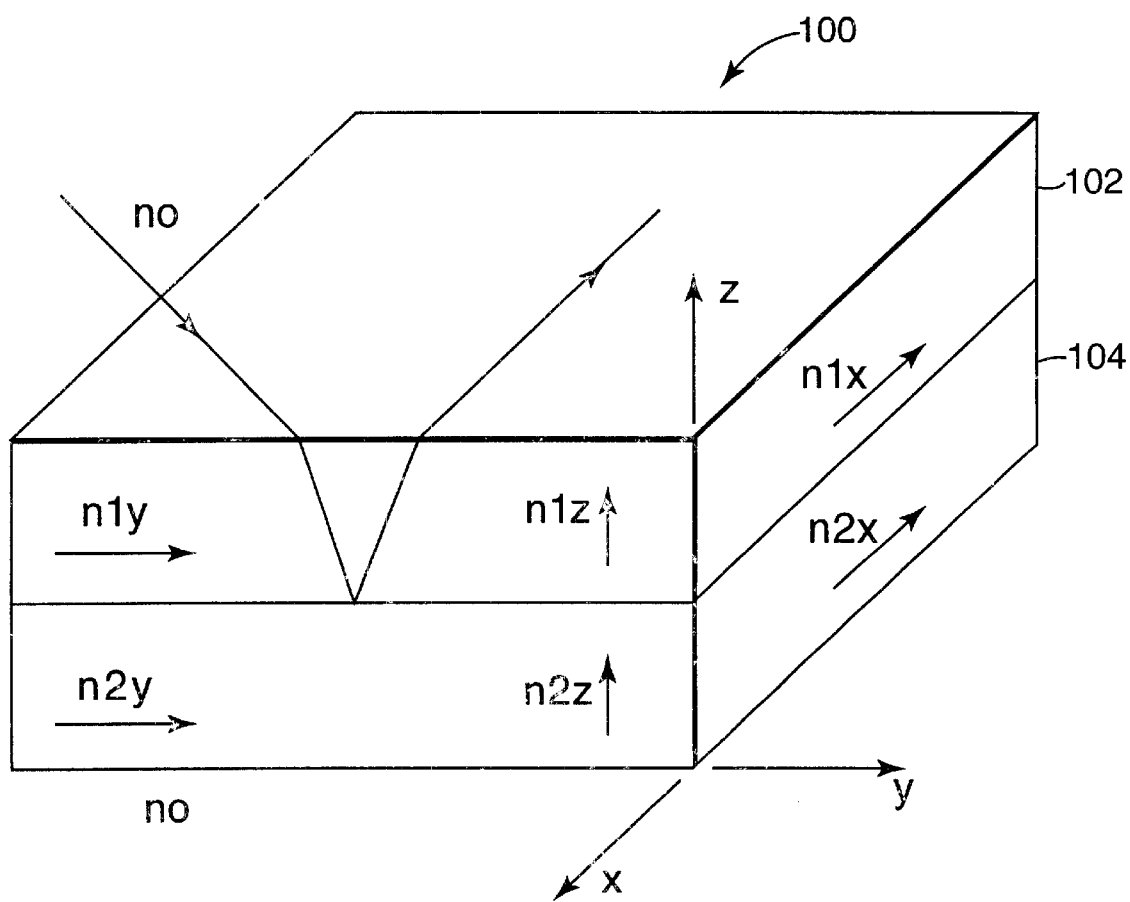

FIG. 2 shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce the desired optical properties.

Referring again to FIG. 1B, the multilayer stack 10 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers in the multilayer stack having an average thickness of not more than 0.5 microns.

In those applications where reflective films (e.g. mirrors) are desired, the desired average transmission for light of each polarization and plane of incidence generally depends upon the intended use of the reflective film. One way to produce a multilayer mirror film is to biaxially stretch a multilayer stack. For a high efficiency reflective film, average transmission along each stretch direction at normal incidence over the visible spectrum (380–750 nm) is desirably less than 10 percent (reflectance greater than 90 percent), preferably less than 5 percent (reflectance greater than 95 percent), more preferably less than 2 percent (reflectance greater than 98 percent), and even more preferably less than 1 percent (reflectance greater than 99 percent). The average transmission at 60 degrees from the normal from 380–750 nm is desirably less than 20 percent (reflectance greater than 80 percent), preferably less than 10 percent (reflectance greater than 90 percent), more preferably less than 5 percent (reflectance greater than 95 percent), and even more preferably less than 2 percent (reflectance greater than 98 percent), and even more preferably less than 1 percent (reflectance greater than 99 percent).

In addition, asymmetric reflective films may be desirable for certain applications. In that case, average transmission along one stretch direction may be desirably less than, for example, 50 percent, while the average transmission along the other stretch direction may be desirably less than, for example 20 percent, over a bandwidth of, for example, the visible spectrum (380–750 nm), or over the visible spectrum and into the near infrared (e.g., 380–850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to one axis (in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest.

The average transmission at normal incidence for a polarizer in the transmission axis across the visible spectrum (380–750 nm for a bandwidth of 300 nm) is desirably at least 50 percent, preferably at least 70 percent, more preferably at least 80 percent, and even more preferably at least 90 percent. The average transmission at 60 degrees from the normal (measured along the transmission axis for p-polarized light) for a polarizer from 380–750 nm is desirably at least 50 percent, preferably at least 70 percent, more preferably at least 80 percent, and even more preferably at least 90 percent.

The average transmission for a multilayer reflective polarizer at normal incidence for light polarized in the direction of the extinction axis across the visible spectrum (380–750 nm for a bandwidth of 300 nm) is desirably at less than 50 percent, preferably less than 30 percent, more preferably less than 15 percent, and even more preferably less than 5 percent. The average transmission at 60 degrees from the normal (measured along the transmission axis for p-polarized light) for a polarizer for light polarized in the direction of the extinction axis from 380–750 nm is desirably less than 50 percent, preferably less than 30 percent, more preferably less than 15 percent, and even more preferably less than 5 percent.

For certain applications, high reflectivity for p-polarized light with its plane of polarization parallel to the transmission axis at off-normal angles are preferred. The average reflectivity for light polarized along the transmission axis should be more than 20 percent at an angle of at least 20 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so). This construction is typically desired when the multilayer optical film is used as a reflector in a backlight system according to the present invention.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The percent RMS color, $C_{RMS}$ 1, can be determined according to the equation:

$$C_{RMS} = \frac{\int_{\lambda 1}^{\lambda 2}\left((T-\overline{T})^2\right)^{1/2}d\lambda}{\overline{T}}$$

where the range 11 to 12 is the wavelength range, or bandwidth, of interest, T is the transmissivity along the transmission axis, and $\overline{T}$ 2 is the average transmissivity along the transmission axis in the wavelength range of interest. For applications where a low color polarizer is desirable, the percent RMS color should be less than 10 percent, preferably less than 8 percent, more preferably less than 3.5 percent, and even more preferably less than 2 percent at an angle of at least 30 degrees from the normal, preferably at least 45 degrees from the normal, and even more preferably at least 60 degrees from the normal.

Preferably, a reflective polarizer combines the desired percent RMS color along the transmission axis for the particular application with the desired amount of reflectivity along the extinction axis across the bandwidth of interest. For polarizers having a bandwidth in the visible range (400–700 nm, or a bandwidth of 300 nm), average transmission along the extinction axis at normal incidence is desirably less than 40 percent, more desirably less than 25 percent, preferably less than 15 percent, more preferably less than 5 percent and even more preferably less than 3 percent.

Materials Selection and Processing

With the design considerations described in the above mentioned U.S. patent application Ser. No. 08/402,041, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline, or liquid crystalline material, preferably a polymer. The second material, in turn, may be crystalline, semi-crystalline, or amorphous. The second material may have a birefringence opposite to or the same as that of the first material. Or, the second material may have no birefringence. It should be understood that in the polymer art it is generally recognized that polymers are typically not entirely crystalline, and therefore in the context of the present invention, crystalline or semi-crystalline polymers refer to those polymers that are not amorphous and includes any of those materials commonly referred to as crystalline, partially crystalline, semi-crystalline, etc. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanel diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a coPEN.

Particularly preferred combinations of layers in the case of polarizers include PEN/coPEN, polyethylene terephthalate (PET)/coPEN, PEN/sPS, PET/sPS, PEN/Estar, and PET/Estar, where "coPEN" refers to a copolymer or blend based upon naphthalene dicarboxylic acid (as described above) and Estar is polycyclohexanedimethylene terephthalate commercially available from Eastman Chemical Co.

Particularly preferred combinations of layers in the case of reflective films include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from Minnesota Mining and Manufacturing Company, St. Paul, Minn.

The number of layers in the film is selected to achieve the desired optical properties using the minimum number of layers for reasons of film thickness, flexibility and economy. In the case of both polarizers and reflective films, the number of layers is preferably less than 10,000, more preferably less than 5,000, and even more preferably less than 2,000.

As discussed above, the ability to achieve the desired relationships among the various indices of refraction (and thus the optical properties of the multilayer film) is influenced by the processing conditions used to prepare the multilayer film. In the case of organic polymers which can be oriented by stretching, the films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of reflective films the film is stretched substantially in two directions (biaxial orientation).

The film may be allowed to dimensionally relax in the cross-stretch direction from the natural reduction in cross-stretch (equal to the square root of the stretch ratio); it may simply be constrained to limit any substantial change in cross-stretch dimension; or it may be actively stretched in the cross-stretch dimension. The film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are interdependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratio in the range from 1:2 to 1:10 (more preferably 1:3 to 1:7) in the stretch direction and from 1:0.2 to 1:10 (more preferably from 1:0.2 to 1:7) orthogonal to the stretch direction is preferred.

Suitable multilayer films may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

Exemplary multilayer reflective mirror films and multilayer reflective polarizers will now be described in the following examples.

EXAMPLE 1

(PEN:THV 500, 449, Mirror)

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 weight percent phenol/40 weight percent dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50 percent of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100 degrees C and heated to 140 degrees C in 60 seconds. Stretching then commenced at 10 percent/sec (based on original dimensions) until the sample was stretched to about 3.5×3.5. Immediately after the stretching the sample was cooled by blowing room temperature air at it.

Figure 3:
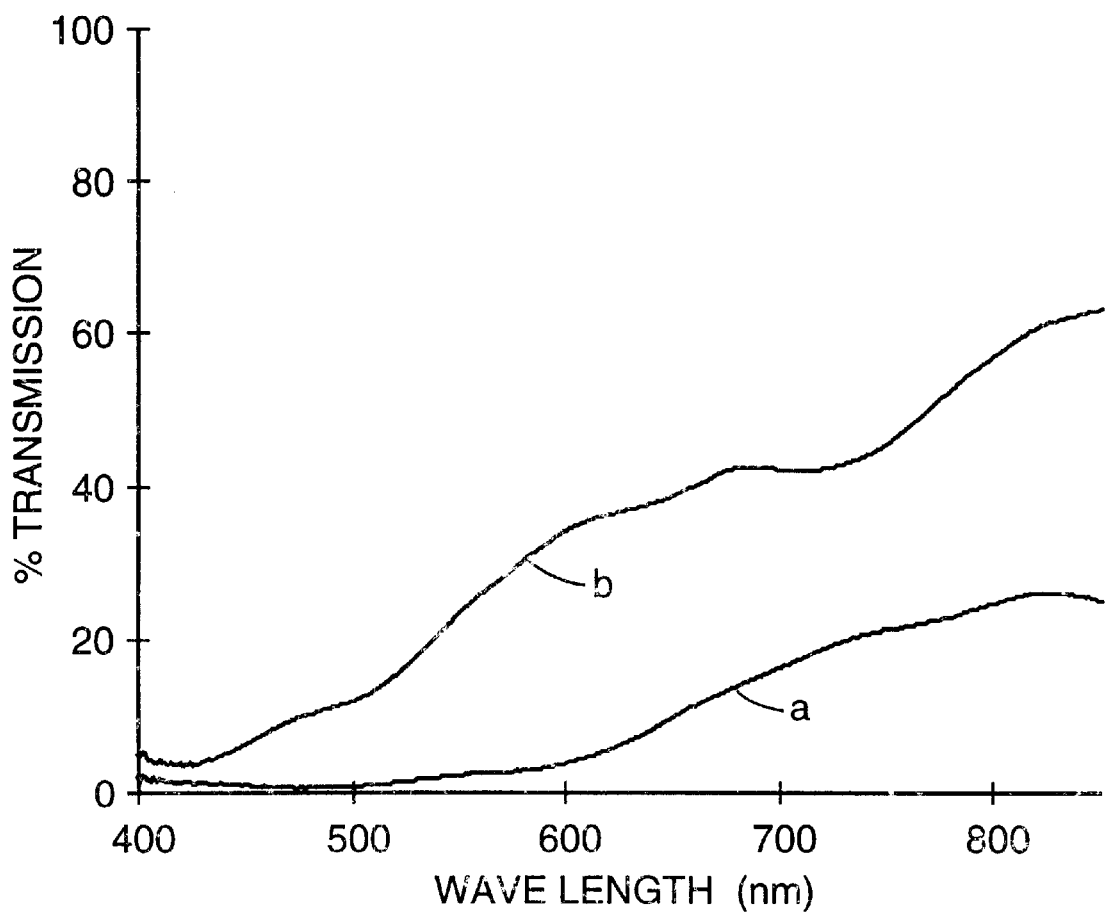
FIGS. 3 through 8 show transmission spectra for the multilayer optical films of Examples 1 through 6.

FIG. 3 shows the transmission of this multilayer film. Curve (a) shows the response at normal incidence for light polarized in the transmission direction, while curve (b) shows the response at 60 degrees for p-polarized light polarized in the transmission direction.

EXAMPLE 2

(PEN:PMMA, 601, Mirror)

A coextruded film containing 601 layers was made on a sequential flat-film-making line via a coextrusion process. Polyethylene Naphthalate (PEN) with an Intrinsic Viscosity of 0.57 dl/g (60 weight percent phenol/40 weight percent dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per hour with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 50 pounds per hour of PEN from extruder A. The web was length oriented to a draw ratio of about 3.2 with the web temperature at about 280 degrees F. The film was subsequently preheated to about 310 degrees F in about 38 seconds and drawn in the transverse direction to a draw ratio of about 4.5 at a rate of about 11 percent per second. The film was then heat-set at 440 degrees F with no relaxation allowed. The finished film thickness was about 3 mil.

Figure 4:
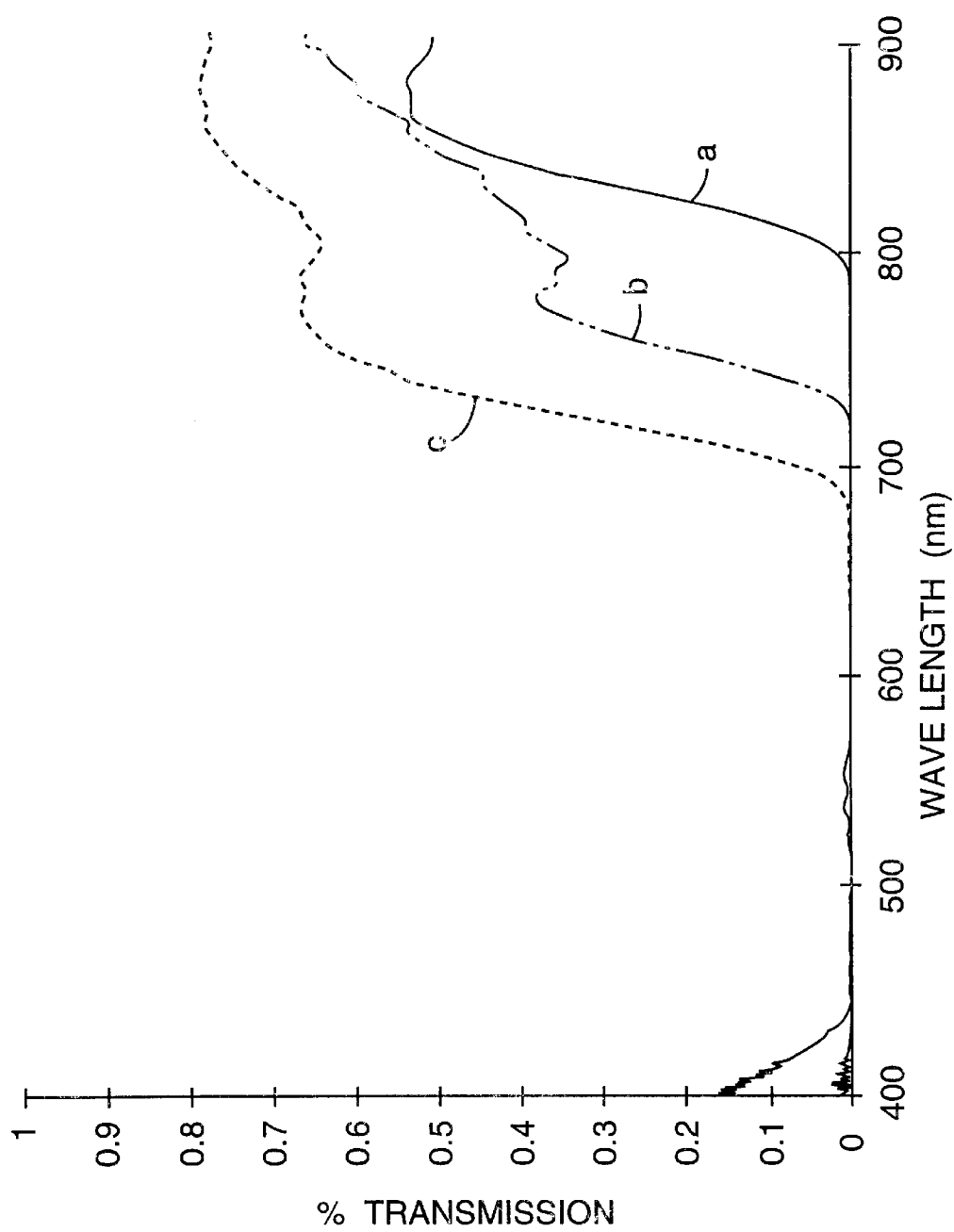

As seen in FIG. 4, curve (a), the bandwidth at normal incidence is about 350 nm with an average in-band extinction of greater than 99 percent. The amount of optical absorption is difficult to measure because of its low value, but is less than 1 percent. At an incidence angle of 50 percent from the normal both s (curve (b)) and p-polarized (curve (c)) light showed similar extinctions, and the bands were shifted to shorter wavelengths as expected. The red band-edge for s-polarized light is not shifted to the blue as much as for p-polarized light due to the expected larger bandwidth for s-polarized light, and due to the lower index seen by the p-polarized light in the PEN layers.

EXAMPLE 3

(PEN:PCTG, 449, Polarizer)

A coextruded film containing 481 layers was made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthalate (PEN) with an intrinsic viscosity of 0.47 dl/g (60 weight percent phenol/40 weight percent dichlorobenzene) was delivered to the feedblock by one extruder at a rate of 25.0 pounds per hour. Glycol modified polyethylene dimethyl cyclohexane terephthalate (PCTG 5445 from Eastman) was delivered by another extruder at a rate of 25.0 pounds per hour. Another stream of PEN from the above extruder was added as skin layers after the multipliers at a rate of 25.0 pounds per hour. The cast web was 0.007 inches thick and 12 inches wide. The web was layer uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100 degrees C and heated to 135 degrees C for 45 seconds. Stretching was then commenced at 20 percent/second (based on original dimensions) until the sample was stretched to about 6:1 (based on gripper to gripper measurements). Immediately after stretching, the sample was cooled by blowing room temperature air at it. In the center, the sample was found to relax by a factor of 2.0.

Figure 5:
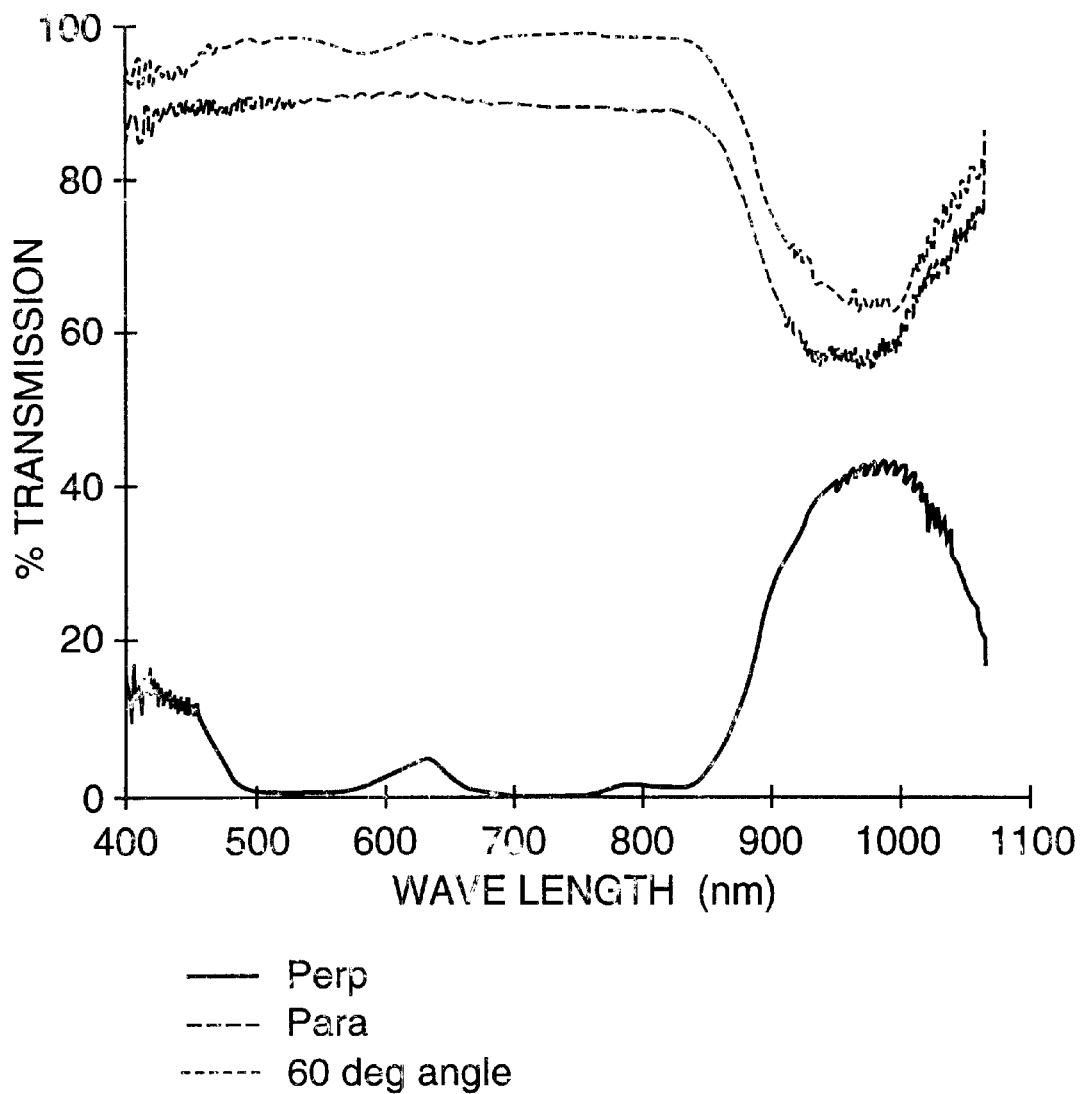

FIG. 5 shows the transmission of this multilayer film where curve a shows transmission of light polarized in the non-stretch direction at normal incidence, curve b shows transmission of p-polarized light polarized in the non-stretched direction at 60 degree incidence, and curve c shows the transmission of light polarized in the stretch direction at normal incidence. Average transmission for curve a from 400–700 nm is 89.7 percent, average transmission for curve b from 400–700 nm is 96.9 percent, and average transmission for curve c from 400–700 nm is 4.0 percent. Percent RMS color for curve a is 1.05 percent, and percent RMS color for curve b is 1.44 percent.

EXAMPLE 4

(PEN:CoPEN, 601, Polarizer)

A coextruded film containing 601 layers was made on a sequential flat-film-making line via a coextrusion process. A Polyethylene naphthalate (PEN) with an intrinsic viscosity of 0.54 dl/g (60 weight percent Phenol plus 40 weight percent dichlorobenzene) was delivered by on extruder at a rate of 75 pounds per hour and the coPEN was delivered by another extruder at 65 pounds per hour. The coPEN was a copolymer of 70 mole percent 2,6 naphthalene dicarboxylate methyl ester, 15 percent dimethyl isophthalate and 15 percent dimethyl terephthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. The PEN skin layers were coextruded on the outside of the optical stack with a total thickness of 8 percent of the coextruded layers. The optical stack was multiplied by two sequential multipliers. The nominal multiplication ratio of the multipliers were 1.2 and 1.27, respectively. The film was subsequently preheated to 310 degree F in about 40 seconds and drawn in the transverse direction to a draw ratio of about 5.0 at a rate of 6 percent per second. The finished film thickness was about 2 mils.

Figure 6:
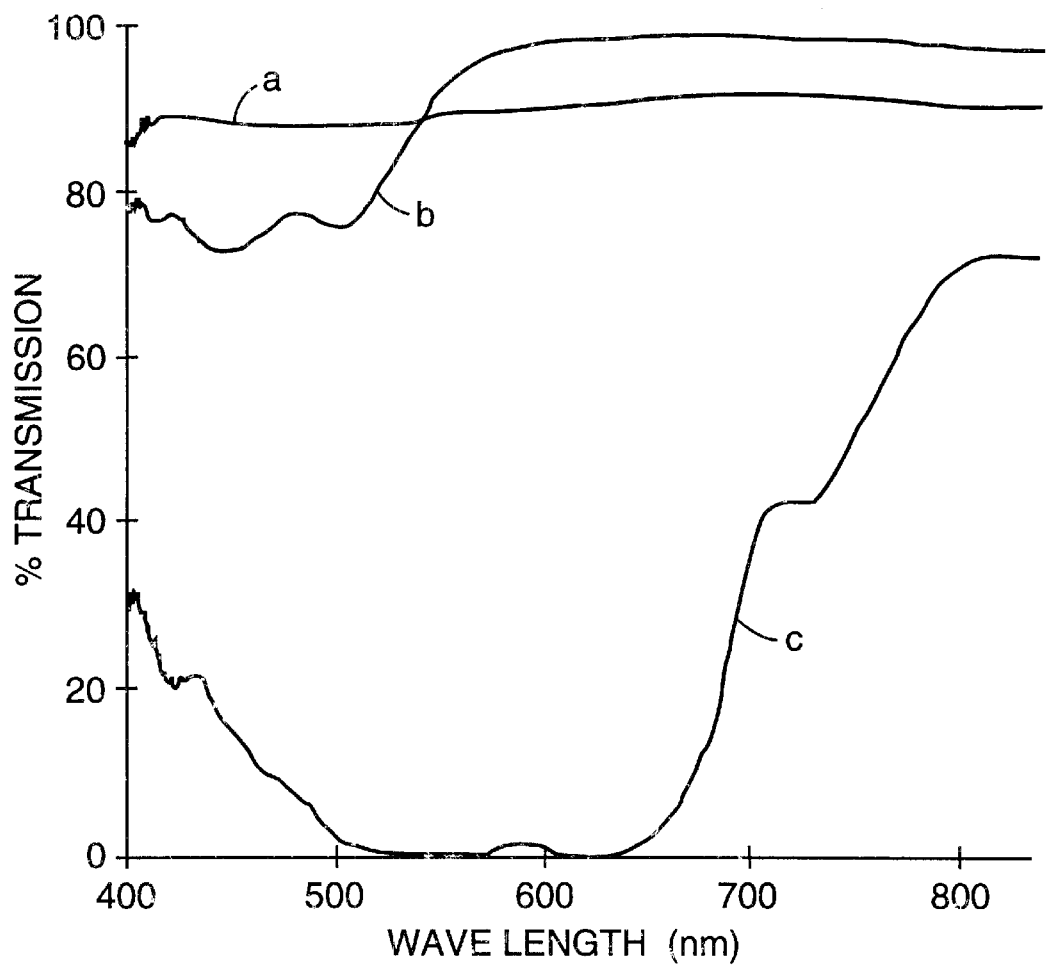

FIG. 6 shows the transmission for this multilayer film. Curve a shows transmission of light polarized in the non-stretch direction at normal incidence, curve b shows transmission of p-polarized light at 60 degree incidence, and curve c shows transmission of light polarized in the stretch direction at normal incidence. Note the very high transmission of p-polarized light in the non-stretch direction at both normal and 60 degree incidence (80–100 percent). Also note the very high reflectance of light polarized in the stretched direction in the visible range (400–700 nm) shown by curve c. Reflectance is nearly 100 percent between 500 and 650 nm.

EXAMPLE 5

(PEN:sPS, 481, Polarizer)

A 481 layer multilayer film was made from a polyethylene naphthalate (PEN) with an intrinsic viscosity of 0.56 dVg measured in 60 weight percent phenol and 40 weight percent dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2x) multipliers were used. Equal thickness skin layers containing the same PEN fed to the feedblock were added after the final multiplier at a total rate of 22 pounds per hour. The web was extruded through a 12 inch wide die to a thickness of about 0.011 inches (0.276 mm). The extrusion temperature was 290 degrees C.

This web was stored at ambient conditions for nine days and then uniaxially oriented on a tenter. The film was preheated to about 320 degrees F (160 degrees C) in about 25 seconds and drawn in the transverse direction to a draw ratio of about 6:1 at a rate of about 28 percent per second. No relaxation was allowed in the stretched direction. The finished film thickness was about 0.0018 inches (0.046 mm).

Figure 7:
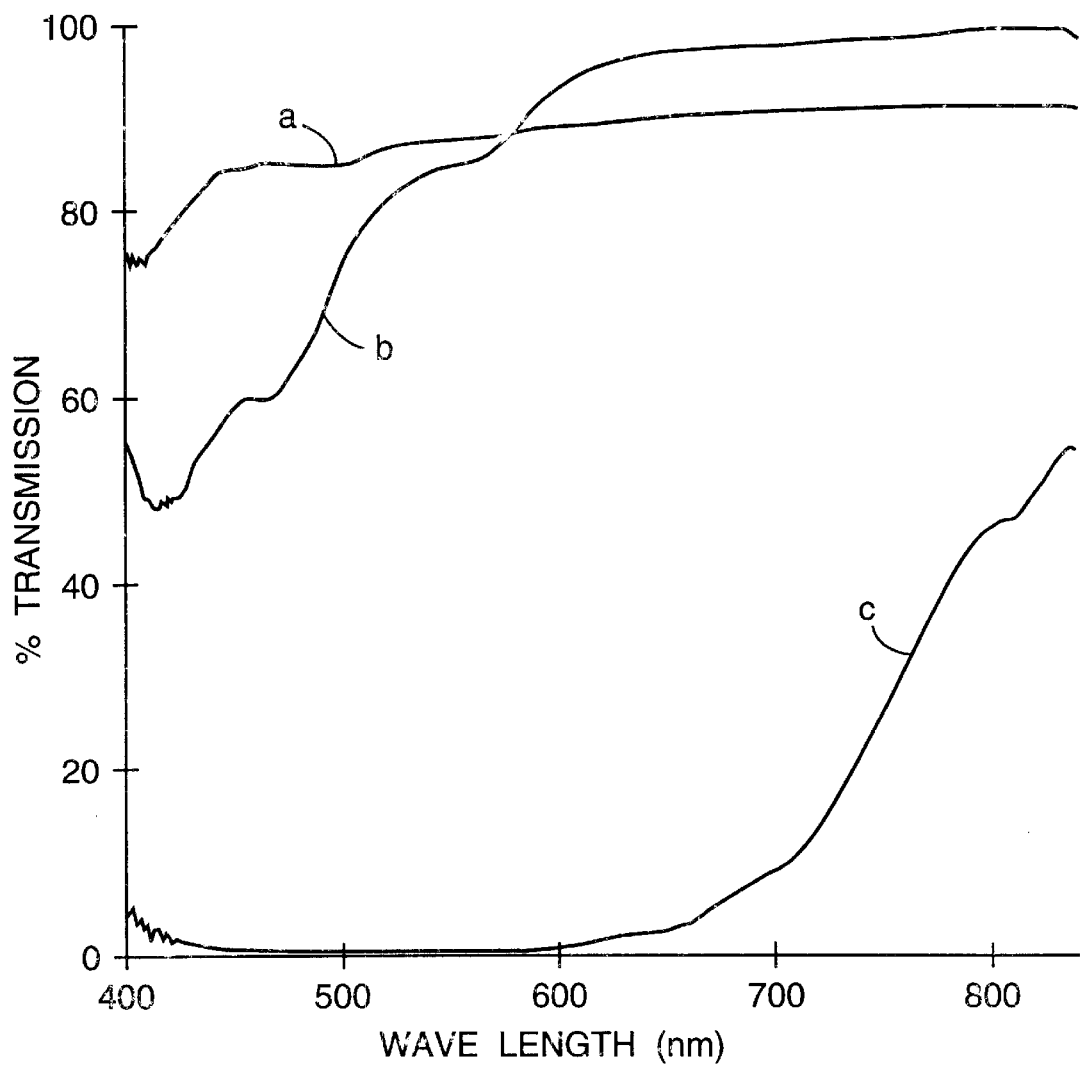

FIG. 7 shows the optical performance of this PEN:sPS reflective polarizer containing 481 layers. Curve a shows transmission of light polarized in the non-stretch direction at normal incidence, curve b shows transmission of p-polarized light at 60 degree incidence, and curve c shows transmission of light polarized in the stretch direction at normal incidence. Note the very high transmission of p-polarized light at both normal and 60 degree incidence. Average transmission for curve a over 400–700 nm is 86.2 percent, the average transmission for curve b over 400–700 nm is 79.7 percent. Also note the very high reflectance of light polarized in the stretched direction in the visible range (400–700 mn) shown by curve c. The film has an average transmission of 1.6 percent for curve c between 400 and 700 nm. The percent RMS color for curve a is 3.2 percent, while the percent RMS color for curve b is 18.2 percent.

EXAMPLE 6

(PEN:CoPEN, 603, Polarizer)

A reflecting polarizer comprising 603 layers was made on a sequential flat-film making line via a coextrusion process. A polyethylene naphthalate (PEN) with an intrinsic viscosity of 0.47 dl/g (in 60 weight percent phenol plus 40 weight percent dichlorobenzene) was delivered by an extruder at a rate of 83 pounds (38 kg) per hour and the CoPEN was delivered by another extruder at 75 pounds (34 kg) per hour. The CoPEN was a copolymer of 70 mole percent, 2,6 naphthalene dicarboxylate methyl ester, 15 mole percent dimethyl terephthalate, and 15 mole percent dimethyl isophthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1.2 and 1.4, respectively. Between the final multiplier and the die, skin layers were added composed of the same CoPEN described above, delivered by a third extruder at a total rate of 106 pounds (48 kg) per hour. The film was subsequently preheated to 300 degrees F (150 degrees C) in about 30 seconds and drawn in the transverse direction to a draw ratio of approximately 6 at an initial rate of about 20 percent per second. The finished film thickness was approximately 0.0035 inch (0.089 mm).

Figure 8:
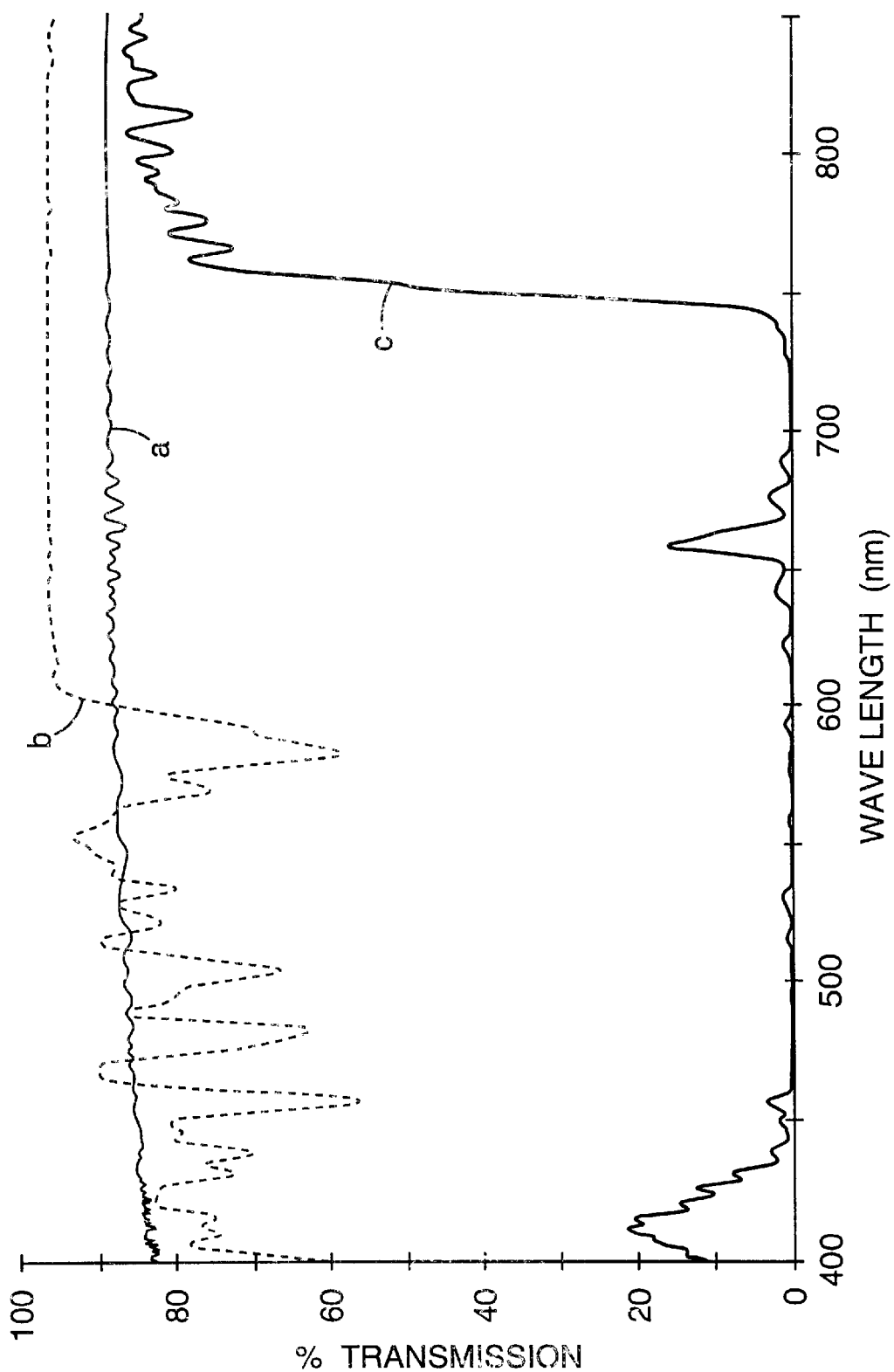

FIG. 8 shows the optical performance of the polarizer of Example 6. Curve a shows transmission of light polarized in the non-stretch direction at normal incidence, curve b shows transmission of p-polarized light in the nonstretch direction at 50 degree angle of incidence, and curve c shows transmission of light polarized in the stretch direction at normal incidence. Note the very high transmission of light polarized in the non-stretch direction. Average transmission for curve a over 400–700 nm is 87 percent. Also note the very high reflectance of light polarized in the stretched direction in the visible range (400–700 nm) shown by curve b. The film has an average transmission of 2.5 percent for curve b between 400 and 700 nm. In addition, the percent RMS color of this polarizer is very low. The percent RMS color for curve b is 5 percent.

While the multilayer optical stacks, as described above, can provide significant and desirable optical properties, other properties, which may be mechanical, optical, or chemical, are difficult to provide in the optical stack itself without degrading the performance of the optical stack. Such properties may be provided by including one or more layers with the optical stack that provide these properties while not contributing to the primary optical function of the optical stack itself. Since these layers are typically provided on the major surfaces of the optical stack, they are often known as "skin layers."

A skin layer may be coextruded on one or both major surfaces of the multilayer stack during its manufacture to protect the multilayer stack from the high shear along the feedblock and die walls, and often an outer layer with the desired chemical or physical properties can be obtained by mixing an additive, such as, for example, a UV stabilizer, into the polymer melt that makes up the skin layer, and coextruding the skin layer with altered properties onto one or both sides of the multilayer optical stack during manufacture. Alternately, additional layers may be coextruded on the outside of the skin layers during manufacture of the multilayer film; they may be coated onto the multilayer film in a separate coating operation; or they may be laminated to the multilayer film as a separate film, foil, or rigid or semi-rigid reinforcing substrate such as polyester (PET), acrylic (PMMA), polycarbonate, metal, or glass. Adhesives useful for laminating the multilayer polymer film to another surface include both optically clear and diffuse adhesives and include both pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer;. block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, biocides, and solvents. Preferred adhesives useful in the present invention include VITEL 3300, a hot melt adhesive available from Shell Chemical Co. (Akron, Ohio), or an acrylic pressure sensitive adhesive such as a 90/10 IOA/AA acrylic adhesive from Minnesota Mining and Manufacturing Company, St. Paul, Minn. When a laminating adhesive is used to adhere the multilayer film to another surface, the adhesive composition and thickness are preferably selected so as not to interfere with the optical properties of the multilayer stack. For example, when laminating additional layers to a multilayer polymer polarizer or mirror wherein a high degree of transmission is desired, the laminating adhesive should be optically clear in the wavelength region that the polarizer or mirror is designed to be transparent.

Figure 10:
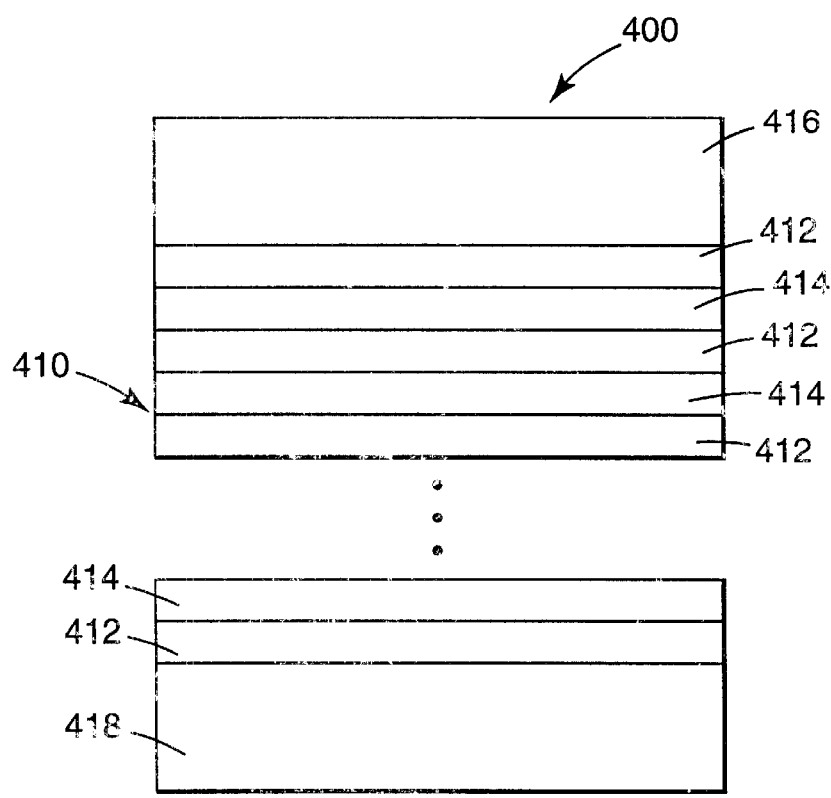
FIG. 10 shows a multilayer film according to the invention having additional layers adhered to both of its major surfaces.
Figure 11:
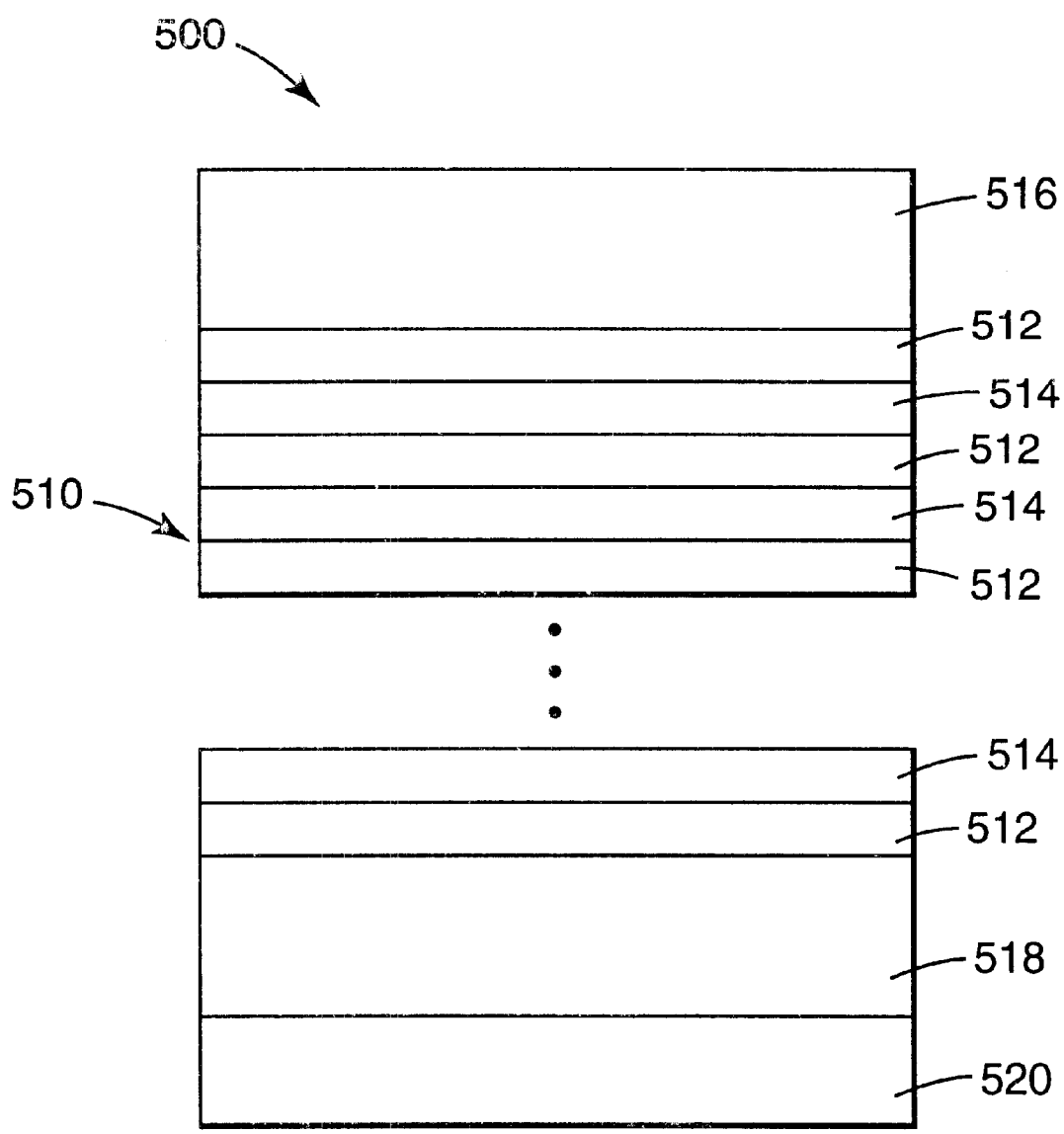
FIG. 11 shows a multilayer film having one additional layer adhered to one of its major surfaces and two additional layers adhered to its other major surface.

FIGS. 10 and 11 illustrate multilayer stacks having respectively one and two additional layers, respectively. FIGS. 10 and 11 will be used below to describe a variety of additional layers that could be applied.

One area in which a skin layer having differing mechanical properties is desirable relates particularly to uniaxially oriented multilayer optical stacks, such as reflective polarizers. Such stacks often tend to show a low tear resistance in the principal draw direction. This can lead to reduced yields during the manufacturing process or to subsequent breakage of the film during handling. In order to resist this, tear resistant layers may be adhered to the outer major surfaces of the optical stack. These tough layers may be of any appropriate material and could even be the same as one of the materials used in the optical stack. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the tough and optical layers, viscoelastic response, relaxation and crystallization behavior under draw conditions, thermal stability at use temperatures, weatherability, ability to adhere to coatings and permeability to various gases and solvents. Of course, as previously stated, it is important that the material chosen not have optical properties deleterious to those of the optical stack. They may be applied during the manufacturing process or later coated onto or laminated to the optical stack. Adhering these layers to the optical stack during the manufacturing process, such as by a coextrusion process, provides the advantage that the optical stack is protected during the manufacturing process.

Using FIG. 10 to illustrate this aspect of the invention, a multilayer optical stack having tear resistant layers 400 is shown. Film 400 includes an optical stack 410. Optical stack 410 includes alternating layers 412 and 414 of two polymers having differing optical properties. Attached to the major surfaces of optical stack 410 are tear resistant layers 416 and 418. It should be noted that, although layers 416 and 418 are shown in FIG. 10 as thicker than layers 412 and 414, FIG. 10 is not to scale for a generally preferred embodiment. In general it is desirable that each of layers 416 and 418 have a thickness greater than 5 percent of the thickness of the optical stack. It is preferred that each of layers 416 and 418 have a thickness in the range of 5 percent to 60 percent of the thickness of the optical stack to provide tear resistance without unnecessarily increasing the amount of material used. Thus, if the optical stack has 600 layers, in such a preferred embodiment the thickness of each of tear resistant layers 416 and 418 would be equal to the thickness of 30 to 360 of the layers of the stack. In a more preferred embodiment each of the tear resistant layers 416 and 418 would have a thickness in the range of 30 percent to 50 percent of that of the optical stack.

In a particularly desirable embodiment, tear resistant outer layers may be of one of the same materials used in alternating layers 412 and 414. In particular, it has been discovered that in a reflective polarizer comprising alternating layers of PEN and coPEN, tear resistant outer layers of coPEN may be coextruded during the manufacturing process.

EXAMPLE 7

A multilayered composite of alternating PEN and coPEN layers to form a reflective polarizer was coextruded with thick skin layers of coPEN to form a tear resistant reflective polarizer. A coextruded film containing 603 layers was made on a sequential flat-film extruder. A polyethylene naphthalate (PEN) with an intrinsic viscosity of 0.47 dl/g (in 60 weight percent phenol plus 40 weight percent dichlorobenzene) was delivered by an extruder at a rate of 86 pounds per hour and the coPEN was delivered by another extruder at 78 pounds per hour. The coPEN was a copolymer of 70 mole percent, 2,6 naphthalene dicarboxylate methyl ester and 30 percent dimethyl terephthalate with ethylene glycol. The feedblock extruded 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1.2 and 1.27, respectively. Between the final multipliers and the die, composed of coPEN as described above, layers were added. These layers were charged and delivered by a third extruder at a total rate of 187 pounds per hour. The film with the additional coPEN outer layers was preheated to 320 degrees F in about 40 seconds and drawn in the transverse direction to a draw ratio of approximately 6 at an initial rate of about 20 percent per second. The finished film had a thickness of approximately 100 $\mu$m including an inner multilayered optical stack of about 50 $\mu$m thickness and two exterior outer layers (one on each side of the film) of about 25 $\mu$m thickness, each. Tear resistance improved over the case without skins allowing the creation of wound rolls of tough reflective polarizer. Specifically, tear resistance was measured on films made according to this example and on film made under similar conditions but without coPEN skin layers using a trouser tear test along the principal draw direction, according to ASTM D-1938. Average film thicknesses were 100 $\mu$m and 48 $\mu$m, respectively. The average tear force values were 60.2 and 2.9 grams force, with standard deviations of 4.44 and 0.57 grams force, respectively. Analysis of the coPEN skin layers showed low orientation with indices of refraction of 1.63, 1.62, and 1.61 at 633 nm. Good interlayer adhesion was demonstrated by the difficulty of cleanly separating the construction. For further comparison a 48 $\mu$m optical stack having 3.8 $\mu$m outer layers of PEN was tested and found to have an average tear force of 2.8 grams with a standard deviation of 1.07.

The appearance and/or performance of a film may be altered by including a skin layer having a dye or pigment that absorbs in one or more selected regions of the spectrum. This can include portions or all of the visible spectrum as well as ultraviolet and infrared. Of course, if all of the visible spectrum is absorbed, the layer will be opaque. These can be selected in order to change the apparent color of light transmitted or reflected by the film. They can also be used to compliment the properties of the film, particularly where the film transmits some frequencies while reflecting others. The use of an UV absorptive material in a cover layer is particularly desirable because it may be used to protect the inner layers that may be unstable when exposed to UV radiation. Thus, FIG. 9 illustrates such a film with layer 316 representing a layer containing an electromagnetic absorbing material.

Figure 9:
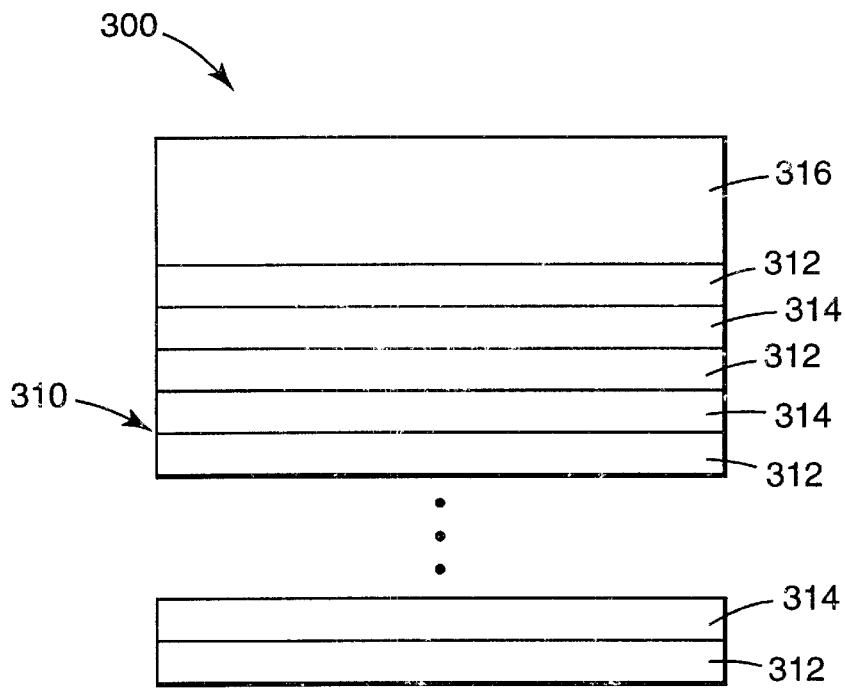
FIG. 9 shows a multilayer film of the invention having an additional layer adhered to one of its major surfaces.

Similar to the electromagnetic absorbing materials described above, a fluorescent material could be incorporated in layer 316 of FIG. 9 or one or both of layers 416 and 418 of FIG. 9. Fluorescent materials absorb electromagnetic energy in the ultraviolet region of the spectrum and reemit in the visible. Desirable fluorescent materials include hindered amine light stabilizers (HALS) and are described in more detail in U.S. patent application Ser. No. 08/345,608, filed Nov. 28, 1994, the disclosure of which is incorporated herein by reference.

Pressure sensitive adhesives form another desirable class of materials that may be applied to a multilayer stack as layer 316 of FIG. 9 or one of layers 416 or 418 of FIG. 10. Generally pressure sensitive adhesives may be applied when the optical stack is intended for later lamination to another material, such as a glass or metal substrate.

Another material that could be incorporated in a skin layer such as layer 316 or one of layers 416 or 418 would be a slip agent. A slip agent will make the film easier to handle during the manufacturing process. Typically a slip agent would be used with a mirror film rather than a film intended to transmit a portion of the light striking it. The side including the slip agent would typically be the side intended to be laminated to a supporting substrate in order to prevent the slip agent from increasing haze associated with the reflection.

Another type of additional layer that could be used is a protective layer. Such a layer could be abrasion resistant or resistant to weathering and/or chemical action. Such coatings would be particularly useful in situations where the multilayer film is to be exposed to a harsh or corrosive environment. Examples of abrasion-resistant or hard coatings include acrylic hardcoats such as Acryloid A-11 and Paraloid K-120N, available from Rohm & Haas; urethane acrylates, such as described in U.S. Pat. No. 4,249,011 and those available from Sartomer Corp.; and urethane hardcoats such as those obtained from reacting an aliphatic polyisocyanate such as Desmodur N-3300, available from Miles, Inc. with a polyester such as Tone Polyol 0305, available from Union Carbide. Such layers could also provide protection against transmission of gases such as oxygen or carbon dioxide or water vapor through the film. Again this could be a single layer as shown in FIG. 9 or layers on both sides as shown in FIG. 10.

Other layers that could be added include layers containing holographic images, holographic diffusers, or other diffusing layers. Such layers could be in a hard polymer or in an adhesive.

FIG. 11 shows alternative multilayer film 500 having alternating layers 512 and 514 with protective layers 516, 518, and 520. Thus, multiple additional layers could be provided adjacent a single major surface of the multilayer optical stack. An example of a use for a structure of the type shown in FIG. 11 would be one in which protective layers 516 and 518 were tear resistant structures, as described above, and layer 520 was abrasion resistant.

The foregoing has been examples of various coatings that could be applied to the exterior of a multilayer stack to alter its properties. In general, any additional layers could be added that would have different mechanical, chemical, or optical properties than those of the layers of the stack itself.

What is claimed is:

1. A multilayer optical film comprising:
    (a) an optical stack including alternating layers of at least a first polymer and a second polymer; and
    (b) a holographic image.

2. The multilayer optical film of claim 1, wherein the holographic image is provided in a skin layer.

3. The multilayer optical film of claim 1, wherein the holographic image is provided in a hard polymer.

4. The multilayer optical film of claim 1, wherein the holographic image is provided in an adhesive.

5. The multilayer optical film of claim 1, wherein the holographic image layer is the outermost layer of the film.

6. The multilayer optical film of claim 1, wherein the holographic image layer is not the outermost layer of the film.

7. The multilayer optical film of claim 1, wherein the film is reflective.

8. The multilayer optical film of claim 1, wherein the film is a polarizer.

* * * * *

UNITED STATES PATENT AND TRADEMARK OFFICE
CERTIFICATE OF CORRECTION

PATENT NO. : 6,459,514 B2
DATED : October 1, 2002
INVENTOR(S) : Jonza, James M.

It is certified that error appears in the above-identified patent and that said Letters Patent is hereby corrected as shown below:

Title page,
Item [75], Inventors, delete "Laurence R. Gilbert; Andrew J. Ouderkirk; Carol A. Stover, Michael F. Weber; William W. Merrill."

Column 15,
Lines 5-7, delete claim 6 in its entirety.

Signed and Sealed this

Ninth Day of September, 2003

JAMES E. ROGAN
*Director of the United States Patent and Trademark Office*